United States Patent
Rubiyath et al.

(10) Patent No.: US 10,715,513 B2
(45) Date of Patent: Jul. 14, 2020

(54) SINGLE SIGN-ON MECHANISM ON A RICH CLIENT

(71) Applicant: Microsoft Technology Licensing, LLC, Redmond, WA (US)

(72) Inventors: Abdullah Rubiyath, Bellevue, WA (US); Fanguang Kong, Sammamish, WA (US); Huanhuan Xia, Beijing (CN); Ryan Christopher McMinn, Seattle, WA (US); Christopher James Clarke, Seattle, WA (US); Prashant Thiruvengadachari, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 15/638,441

(22) Filed: Jun. 30, 2017

(65) Prior Publication Data
US 2019/0007392 A1 Jan. 3, 2019

(51) Int. Cl.
*H04L 29/06* (2006.01)
*G06F 21/31* (2013.01)
*G06F 21/41* (2013.01)
*H04L 9/32* (2006.01)

(52) U.S. Cl.
CPC ......... *H04L 63/0815* (2013.01); *G06F 21/31* (2013.01); *G06F 21/41* (2013.01); *H04L 9/32* (2013.01); *H04L 9/3226* (2013.01); *H04L 63/08* (2013.01)

(58) Field of Classification Search
CPC ... H04L 63/0815; H04L 9/3226; H04L 63/08; H04L 9/32; G06F 21/41; G06F 21/31
See application file for complete search history.

(56) References Cited

U.S. PATENT DOCUMENTS

| 5,964,836 A | * | 10/1999 | Rowe | G06F 9/451 709/221 |
| 6,826,696 B1 | | 11/2004 | Chawla et al. | |
| 6,950,983 B1 | * | 9/2005 | Snavely | G06F 16/95 715/206 |

(Continued)

OTHER PUBLICATIONS

Samar, Vipin, "Single Sign-On Using Cookies for Web Applications", In Proceedings of IEEE 8th International Workshops Enabling Technologies: Infrastructure for Collaborative Enterprises, Jun. 18, 1999, 6 pages.

*Primary Examiner* — David Garcia Cervetti

(57) ABSTRACT

Methods and systems are provided that enable single sign-on (SSO) mechanisms on rich clients running hosting applications that include documents with one or more embedded web assets. An embedded web asset may be any resource (e.g., document, image, data, etc.) that is accessed via a browser from within a hosting application. In aspects, authentication of a user identity is required to access an embedded web asset. In particular, an identity management module is provided on a rich client. The identity management module is configured to maintain multiple credentials for multiple user identities that are associated with multiple applications, whether the applications are embedded applications or hosting applications. In this way, a user may access multiple applications, including embedded web assets, associated with each user identity—without signing into each application. That is, a user is able to login a single time for each user identity.

20 Claims, 10 Drawing Sheets

(56) References Cited

U.S. PATENT DOCUMENTS

| | | | |
|---|---|---|---|
| 8,201,217 B1 | 6/2012 | Begen et al. | |
| 8,276,190 B1* | 9/2012 | Chang | H04L 63/0815 |
| | | | 713/176 |
| 8,453,258 B2* | 5/2013 | Weisberger | G06F 21/10 |
| | | | 726/20 |
| 8,631,078 B2* | 1/2014 | Wherry | H04L 51/04 |
| | | | 709/206 |
| 8,763,102 B2 | 6/2014 | Furman et al. | |
| 8,805,946 B1* | 8/2014 | Glommen | H04L 67/10 |
| | | | 709/206 |
| 9,009,806 B2 | 4/2015 | Hyland et al. | |
| 9,064,269 B1* | 6/2015 | Lei | G06Q 30/0241 |
| 9,106,642 B1* | 8/2015 | Bhimanaik | G06F 21/335 |
| 9,191,375 B2 | 11/2015 | Kaler et al. | |
| 9,240,991 B2* | 1/2016 | Zlatarev | H04L 63/0815 |
| 9,288,118 B1* | 3/2016 | Pattan | H04L 67/306 |
| 9,374,244 B1* | 6/2016 | Brandwine | H04L 63/0823 |
| 9,397,990 B1* | 7/2016 | Taly | H04L 63/08 |
| 9,413,745 B1* | 8/2016 | Rowley | G06Q 10/10 |
| 9,483,627 B1* | 11/2016 | Ferg | H04W 12/0608 |
| 9,501,273 B1* | 11/2016 | Dai | G06F 8/65 |
| 9,548,976 B2 | 1/2017 | Belote et al. | |
| 9,774,622 B2* | 9/2017 | Krapf | H04L 9/3234 |
| 10,013,577 B1* | 7/2018 | Beaumont | G06F 21/6263 |
| 10,057,240 B2* | 8/2018 | Mihaylov | H04L 63/0815 |
| 10,200,364 B1* | 2/2019 | Ketharaju | H04L 63/0861 |
| 10,296,558 B1* | 5/2019 | McInerny | G06F 40/131 |
| 10,331,769 B1* | 6/2019 | Hill | G06F 40/134 |
| 2002/0112155 A1* | 8/2002 | Martherus | G06F 21/41 |
| | | | 713/155 |
| 2002/0194483 A1* | 12/2002 | Wenocur | G06Q 10/107 |
| | | | 713/185 |
| 2003/0037131 A1* | 2/2003 | Verma | H04L 29/06 |
| | | | 709/223 |
| 2003/0154398 A1* | 8/2003 | Eaton | G06Q 30/08 |
| | | | 709/227 |
| 2004/0158574 A1* | 8/2004 | Tom | G06Q 20/3674 |
| 2005/0015601 A1* | 1/2005 | Tabi | G06F 21/6227 |
| | | | 713/182 |
| 2005/0204018 A1* | 9/2005 | Jensen | G06F 12/023 |
| | | | 709/219 |
| 2007/0079369 A1* | 4/2007 | Grinstein | G06F 21/629 |
| | | | 726/19 |
| 2007/0106670 A1* | 5/2007 | Yoakum | H04L 67/14 |
| 2008/0209050 A1* | 8/2008 | Li | H04L 29/06 |
| | | | 709/227 |
| 2008/0216153 A1* | 9/2008 | Aaltonen | G06F 21/31 |
| | | | 726/3 |
| 2008/0244719 A1* | 10/2008 | Hariya | G06F 21/41 |
| | | | 726/8 |
| 2008/0281921 A1* | 11/2008 | Hunt | H04L 67/02 |
| | | | 709/206 |
| 2009/0055908 A1* | 2/2009 | Rapoport | H04L 63/0815 |
| | | | 726/6 |
| 2009/0172793 A1* | 7/2009 | Newstadt | G06F 21/31 |
| | | | 726/6 |
| 2009/0265460 A1* | 10/2009 | Balasubramanian | H04L 43/00 |
| | | | 709/224 |
| 2010/0043065 A1 | 2/2010 | Bray et al. | |
| 2010/0050245 A1* | 2/2010 | Samatov | G06F 21/6263 |
| | | | 726/8 |
| 2010/0145960 A1* | 6/2010 | Casteel | G06Q 30/0255 |
| | | | 707/756 |
| 2011/0125593 A1* | 5/2011 | Wright | G06Q 30/02 |
| | | | 705/14.73 |
| 2011/0277027 A1* | 11/2011 | Hayton | H04L 63/0815 |
| | | | 726/8 |
| 2012/0011262 A1* | 1/2012 | Cheng | G06F 15/173 |
| | | | 709/229 |
| 2012/0198535 A1* | 8/2012 | Oberheide | H04L 63/0272 |
| | | | 726/9 |
| 2012/0204250 A1* | 8/2012 | Anderson | G06Q 10/107 |
| | | | 726/9 |
| 2012/0317238 A1* | 12/2012 | Beard | H04L 63/10 |
| | | | 709/219 |
| 2012/0324552 A1* | 12/2012 | Padala | G06F 21/10 |
| | | | 726/6 |
| 2012/0324556 A1* | 12/2012 | Yefimov | H04W 12/06 |
| | | | 726/7 |
| 2013/0047235 A1* | 2/2013 | Pieczul | H04L 63/08 |
| | | | 726/7 |
| 2013/0086656 A1* | 4/2013 | Paddon | G01S 19/246 |
| | | | 726/6 |
| 2013/0212188 A1* | 8/2013 | Duterque | G06Q 30/0201 |
| | | | 709/206 |
| 2013/0318348 A1* | 11/2013 | Lebron | H04L 63/0428 |
| | | | 713/168 |
| 2013/0326037 A1* | 12/2013 | Lyon | G06F 16/9574 |
| | | | 709/223 |
| 2013/0332730 A1* | 12/2013 | Cosentino | H04L 63/0428 |
| | | | 713/168 |
| 2014/0129712 A1* | 5/2014 | Sharp | G06F 21/31 |
| | | | 709/225 |
| 2014/0164447 A1* | 6/2014 | Tarafdar | G06F 16/182 |
| | | | 707/827 |
| 2014/0325627 A1* | 10/2014 | Fee | H04L 63/0807 |
| | | | 726/7 |
| 2015/0089579 A1 | 3/2015 | Manza et al. | |
| 2015/0089614 A1* | 3/2015 | Mathew | H04L 67/141 |
| | | | 726/7 |
| 2015/0149777 A1* | 5/2015 | Kim | H04L 63/0853 |
| | | | 713/169 |
| 2015/0207800 A1* | 7/2015 | Jitkoff | H04L 63/102 |
| | | | 726/4 |
| 2015/0319252 A1* | 11/2015 | Momchilov | H04L 67/141 |
| | | | 709/223 |
| 2016/0127352 A1 | 5/2016 | Xu et al. | |
| 2016/0234318 A1* | 8/2016 | Fardig | H04L 67/02 |
| 2016/0241536 A1* | 8/2016 | Parman | G06F 21/41 |
| 2017/0013070 A1* | 1/2017 | Comstock | H04L 67/146 |
| 2017/0180495 A1* | 6/2017 | Comstock | H04L 67/22 |
| 2017/0244555 A1* | 8/2017 | Beiter | H04L 9/3213 |
| 2017/0244691 A1* | 8/2017 | Berard | H04L 63/08 |
| 2017/0346804 A1* | 11/2017 | Beecham | H04L 63/08 |
| 2018/0063252 A1* | 3/2018 | Sekharan | H04L 65/403 |
| 2018/0176203 A1* | 6/2018 | Wang | H04L 67/146 |
| 2018/0343113 A1* | 11/2018 | Udassin | H04L 9/0822 |
| 2018/0375863 A1* | 12/2018 | Fan | G06F 21/31 |
| 2019/0036907 A1* | 1/2019 | Mathew | H04L 63/10 |
| 2019/0114216 A1* | 4/2019 | Wu | G06F 9/544 |

\* cited by examiner

SINGLE SIGN-ON MECHANISM ON A RICH CLIENT

BACKGROUND

During the course of a day, the average user may access dozens of applications for interrelated productivity and collaboration tasks. In some cases, applications may be embedded in other applications and yet the user may be required to enter login credentials for each of these applications. Additionally, a user may have multiple applications tied to multiple user accounts and may have many different login credentials for the different user accounts. In order to access these many applications and accounts, the user is required to repeatedly sign-in to each application for each of these accounts because the different embedded applications are unable to share sign-in information.

A large number of web asset providers from both first and third parties (e.g., Microsoft® Forms, GeoGebra®, etc.) require sign-in with a particular identity in order to interact with the web assets. Moreover, different web assets may be associated with different user identities (e.g., the user may have an identity for work and another identity for home use). Currently, however, a user is unable to login one time when trying to access first and third party web assets embedded within other applications associated with the same user identity. This poses several problems. Because a user is required to sign-in multiple times, the need for users to memorize a long list of passwords increases, which increases Help Desk calls and costs. Furthermore, customer satisfaction decreases when customers are required to repeatedly enter the same login credentials.

It is with respect to these and other general considerations that example aspects, systems, and methods have been described. Also, although relatively specific problems have been discussed, it should be understood that the examples should not be limited to solving the specific problems identified in the background.

SUMMARY

Methods and systems are provided that enable single sign-on (SSO) mechanisms on rich clients running hosting applications that include one or more embedded web assets. As used herein, a "web asset" refers to any resource (e.g., document, image, video, data, etc.) provided by one or more applications running on a remote computing device (e.g., a web service or website hosted by one or more server computing devices) and accessed via a browser. An "embedded web asset" refers to any resource described above that is accessed via a browser from within a hosting application. In aspects, authentication of a user identity is required to access an embedded web asset. In particular, an identity management module is provided on a rich client. The identity management module is configured to maintain multiple credentials for multiple user identities that are associated with multiple applications, whether the applications are embedded applications or hosting applications. In this way, a user may access multiple applications, including embedded web assets, associated with each user identity—without signing into each application. That is, a user is able to login a single time for each user identity.

Current solutions do not provide for single sign-on mechanisms regarding embedded web assets within a hosting application running on a rich client, even where both the embedded web assets and the hosting application share the same identity provider. For example, if a user opens a hosting document (e.g., any rich client productivity document such as a One Note® document, Word® document, PowerPoint® document, etc.), which includes multiple embedded web assets (e.g., resources associated with first- or third-party web applications such as Microsoft® Forms, GeoGebra®, Microsoft® Word, Microsoft® PowerPoint, etc.), the user is currently required to repeatedly sign into each of these web assets independently—even though the web assets are launched from within the hosting document. When these web assets are associated with the same user identity, the user can become frustrated and confused by the need to repeatedly reenter the same login credentials, resulting in a negative user experience.

To address the above-described issue, a mechanism of securely providing a single sign-on for each user identity on a rich client is disclosed herein. For example, where each of the user identities is maintained by a single identity provider, the identity provider may retrieve and store an identity cookie each time a user is authenticated for access to a browser instance of a web application under various user accounts (e.g., user identities). As used herein, an "identity cookie" is a data packet captured by a browser upon authentication of the user identity (e.g., user account) used to access the browser. In some cases, an identity cookie may include information for validating user credentials. That is, a user may access multiple web applications under a first user identity and may access the same or different web applications under a second user identity. The identity provider may store at least a first identity cookie upon authentication of the first user identity and a second identity cookie upon authentication of the second user identity. As may be appreciated, identity cookies captured for the same user identity may be substantially the same. Thus, each user identity stored by the identity provider may be associated with user credentials (e.g., passwords, secret answers to questions, fingerprint scans, retinal scans, etc.) and at least one identity cookie.

In further aspects, an identity management module may be provided by a rich client and/or within a rich hosting application. For example, where the identity management module is provided on the rich client (e.g., as a module of the operating system or other system programs), the identity management module may manage multiple user identities for access to any application (including multiple hosting applications with embedded web assets) running on the rich client. In this way, based on the SSO mechanisms described herein, when the user has logged into the rich client under a particular user identity (or user account), the user may access any application running on the rich client that is associated with the particular user identity without re-authenticating the particular user identity (e.g., by reentering user credentials). Alternatively, where the identity management module is provided within a rich hosting application, the identity management module may manage multiple user identities for access to any hosting document (including any embedded web assets) created by the rich hosting application under any of the multiple user identities. In this way, based on the SSO mechanisms described herein, when the user has logged into the rich hosting application under a particular user identity (or user account), the user may access any hosting document (including any embedded web assets) that is associated with the particular user identity without re-authenticating the particular user identity (e.g., by reentering user credentials).

In particular, whether the identity management module is provided by the rich client or within a rich hosting application, the identity management module may receive (e.g., from an identity provider) and store at least one identity cookie for each user identity. As detailed above, an identity cookie represents authentication of a user identity to at least one web asset provider. For the same identity provider, multiple identity cookies for the same user identity associated with the same web asset provider (e.g., retrieved during different login events on the browser) may be substantially the same. Alternatively, multiple identity cookies for the same user identity associated with different web asset providers may be substantially the same or may be different; however, such multiple identity cookies may still represent authentication of the same user identity (e.g., based on validation of the same user credentials) by the identity provider. In this case, the identity management module may store a first (1) identity cookie representing authentication of the first user identity to a first web asset provider and a first "prime" (1') identity cookie representing authentication of the first user identity to a second web asset provider. That is, the identity management module may store at least a first identity cookie representing authentication of a first user identity and at least a second identity cookie representing authentication of a second user identity. In this way, the user may access web assets within hosting applications associated with the first user identity without reentering first user credentials, and may access web assets within hosting applications associated with the second user identity without reentering second user credentials.

In an extended aspect, e.g., where the identity management module is provided by the rich client (rather than within a particular rich hosting application), the identity management module may manage multiple user identities associated with different identity providers. That is, a user may maintain multiple user identities (e.g., first and second user identities) associated with a first identity provider, and may maintain multiple user identities (e.g., third and fourth user identities) associated with a second identity provider. In this case, the identity management module may receive and store at least a first identity cookie representing authentication of the first user identity by the first identity provider, at least a second identity cookie representing authentication of the second user identity by the first identity provider, at least a third identity cookie representing authentication of the third user identity by the second identity provider, and at least a fourth identity cookie representing authentication of the fourth user identity by the second identity provider. Thus, the user may access web assets within hosting applications associated with the first user identity without reentering first user credentials, associated with the second user identity without reentering second user credentials, associated with the third user identity without reentering third user credentials, associated with the fourth user identity without reentering fourth user credentials, and so on.

As used herein, a "rich client" refers to a computing device with sufficient hardware and software capabilities for processing and storing at least some data and executing one or more applications, but that may rely on and/or access resources on one or more other computing devices over a network. A "rich application" refers to an application programmed for execution on a rich client. In aspects, a hosting application executing on a rich client (e.g., personal computer, laptop computer, mobile device, tablet, etc.) may be referred to herein as a "rich hosting application." A hosting application may refer to any application that may host (or include) other embedded applications (e.g., embedded web assets). Examples of hosting applications include any productivity application, such as notebook applications, word-processing applications, presentation applications, spreadsheet applications, and the like. Further, a hosting application may enable creation of multiple "hosting documents" under the same or different user identities. A hosting document may include any productivity document, such as a notebook with one or more note pages or tabs, a word document including one or more pages, a spreadsheet workbook with one or more worksheets, a presentation with one or more slides, etc.

In aspects, a first hosting document associated with a rich hosting application (e.g., a first One Note® notebook) may be opened using the first user identity. In this case, when the user attempts to access a web asset (e.g., a resource associated with Microsoft® Forms) embedded in the first hosting document, the identity management module may pass the first identity cookie to a browser for accessing the embedded web asset—without requiring the user to provide authentication (e.g., by reentering user credentials) to the web application hosting the web asset. Further, when the user opens a second hosting document (e.g., a second One Note® notebook) using a second user identity, the identity management module may pass the second identity cookie to the browser for accessing the same or different web asset (e.g., a resource associated with Microsoft® Forms or GeoGebra®) embedded within the second hosting document. Thus, the identity management module is able to manage multiple user identities, as well as access to hosting documents and embedded web assets, associated with each of the multiple user identities. In this way, when a user is accessing a hosting application under a first user identity, the user may access any hosting document (including any associated embedded web assets) created by the hosting application under the first user identity without repeatedly re-authenticating the first user identity (e.g., by reentering first user credentials). Similarly, when a user is accessing the hosting application under a second user identity, the user may access any hosting document (including any associated embedded web assets) created by the hosting application under the second user identity without repeatedly re-authenticating the second user identity (e.g., by reentering second user credentials).

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTIONS OF THE DRAWINGS

Figure 4A:
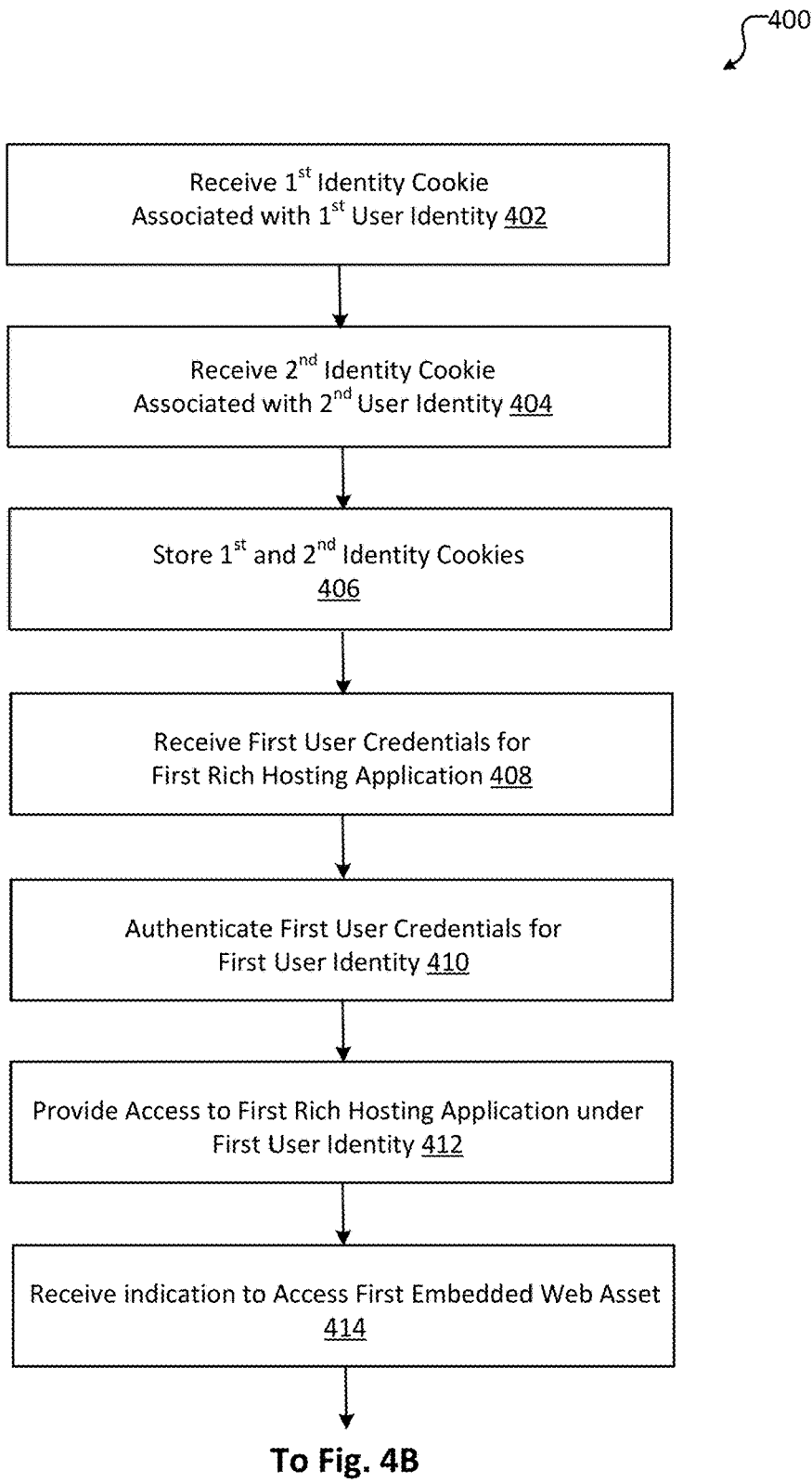
Figure 4B:
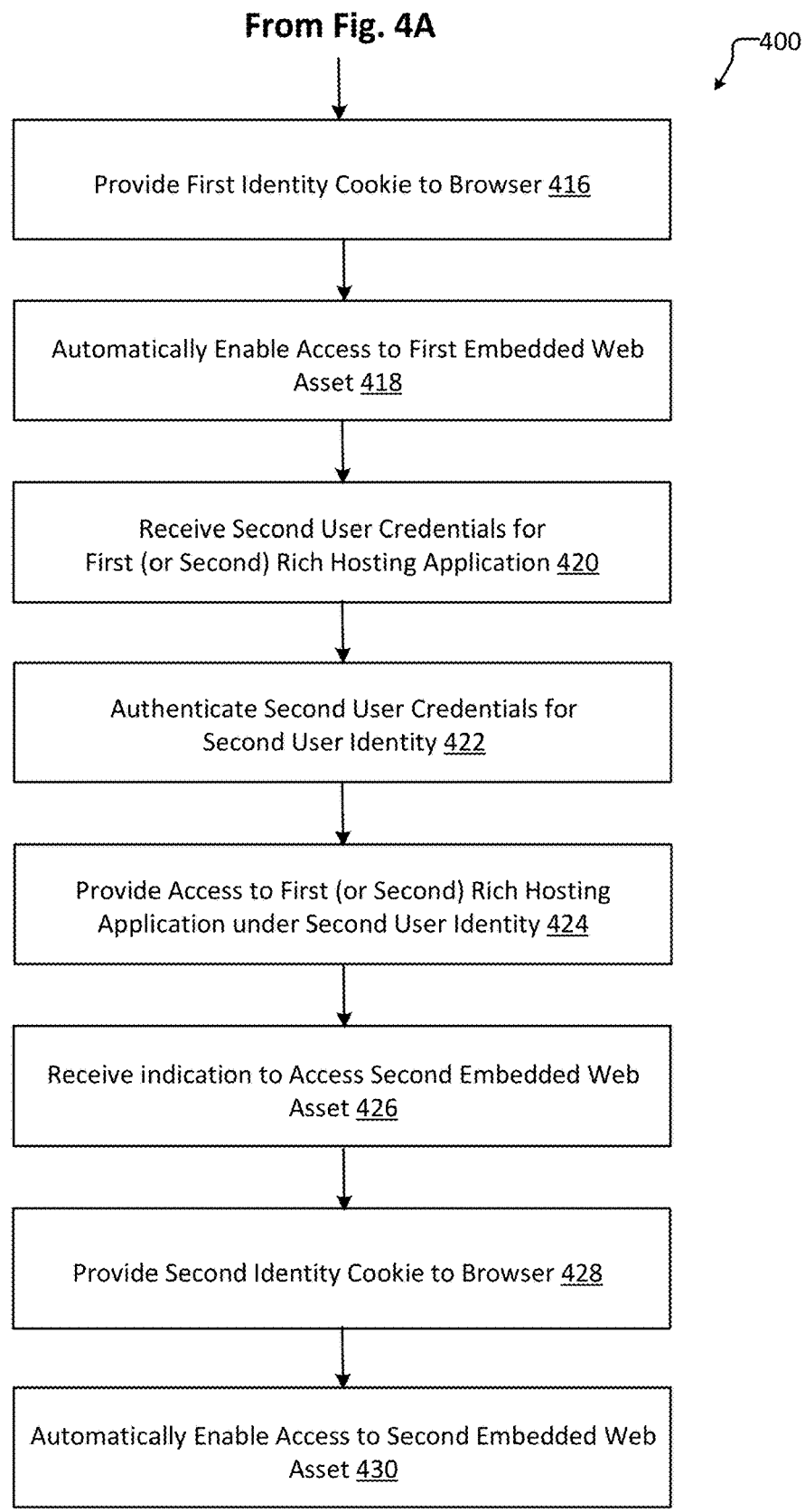

FIGS. 4A and 4B provide a flowchart illustrating a method for providing single sign-on (SSO) mechanisms on rich clients running applications that include embedded web assets.

Figure 5:
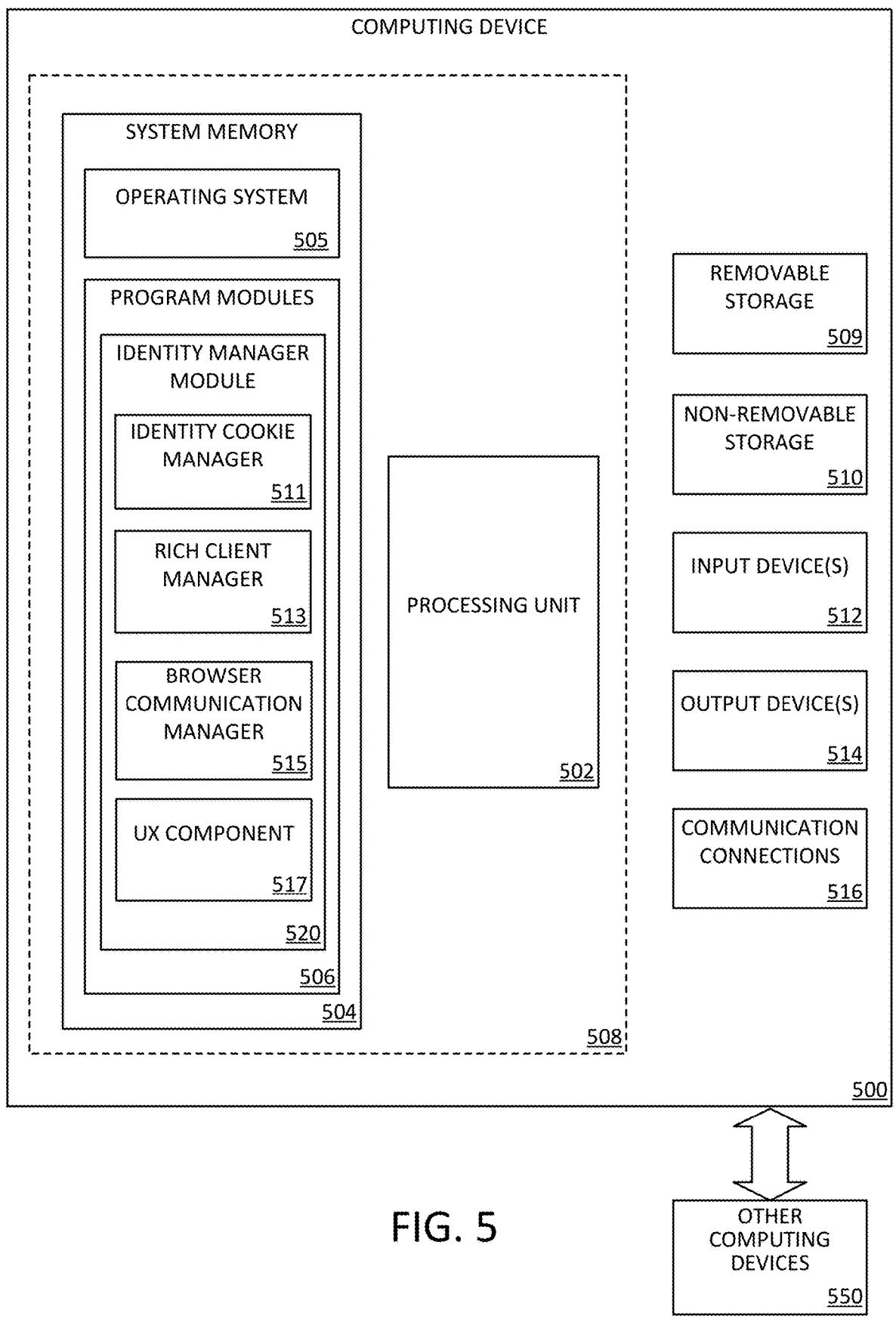

FIG. 5 is a block diagram illustrating example physical components of a computing device with which aspects of the disclosure may be practiced.

Figure 6A:
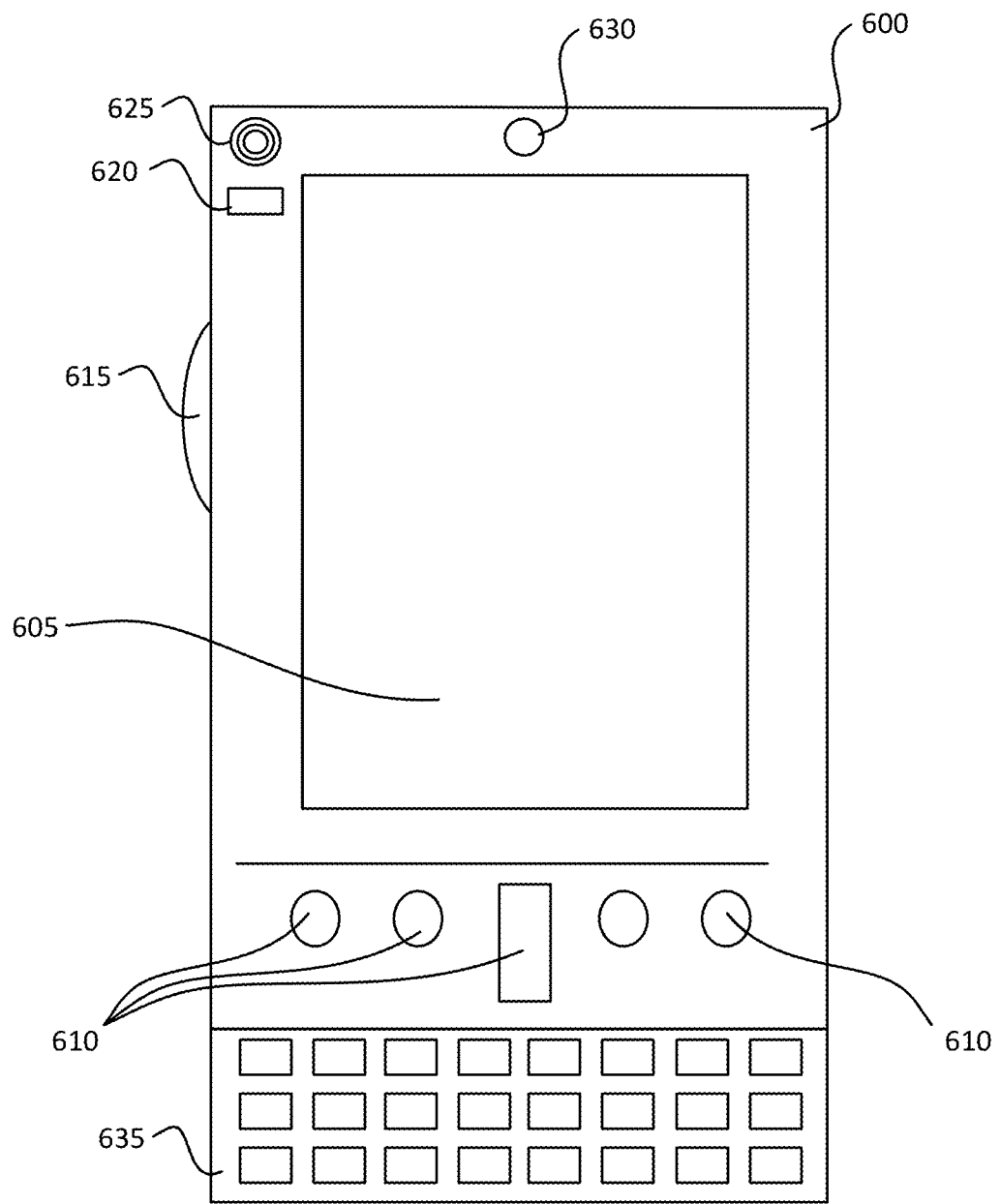
Figure 6B:
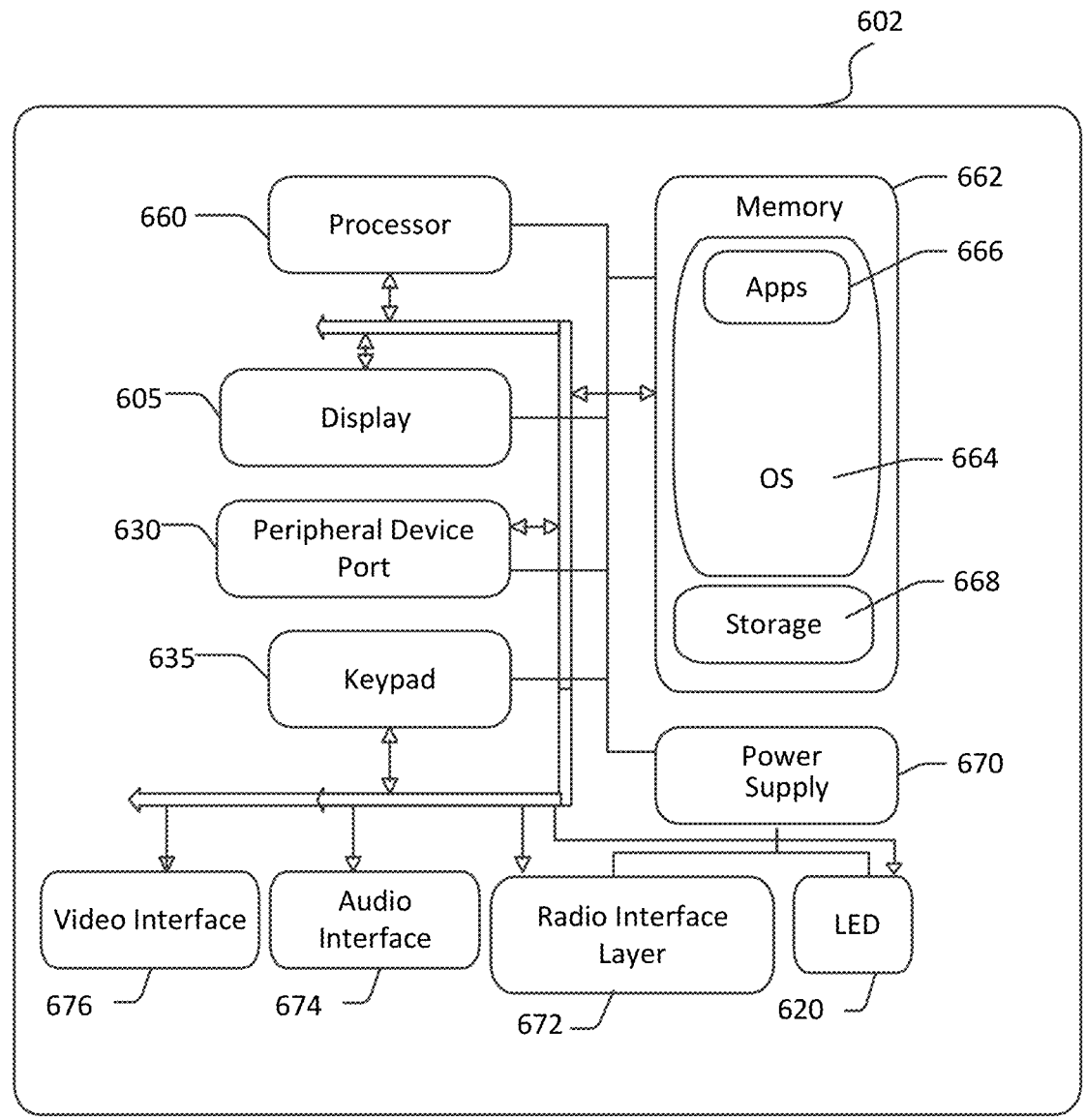

FIGS. 6A and 6B are simplified block diagrams of a mobile computing device with which aspects of the present disclosure may be practiced.

Figure 7:
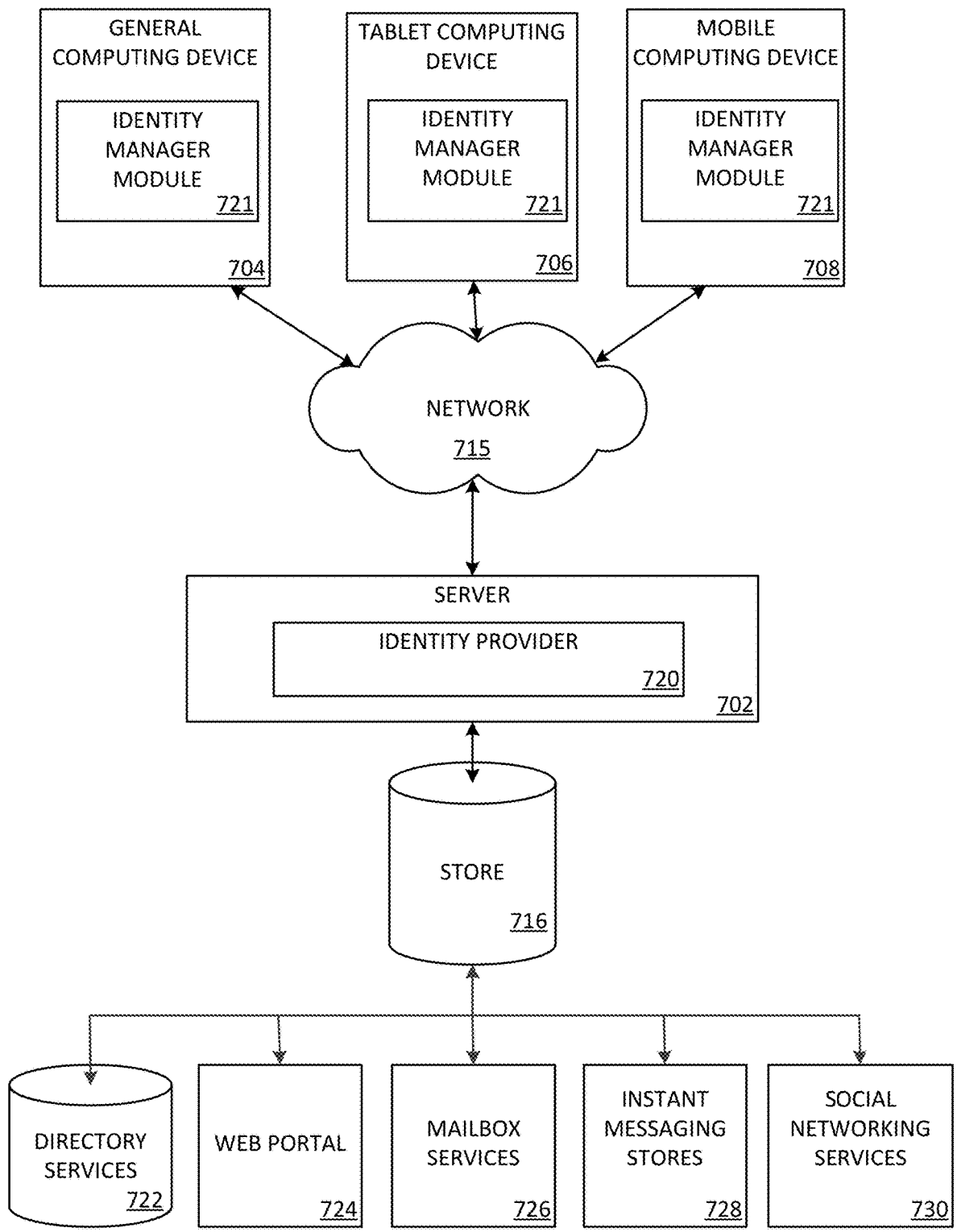

FIG. 7 is a simplified block diagram of a distributed computing system in which aspects of the present disclosure may be practiced.

Figure 8:
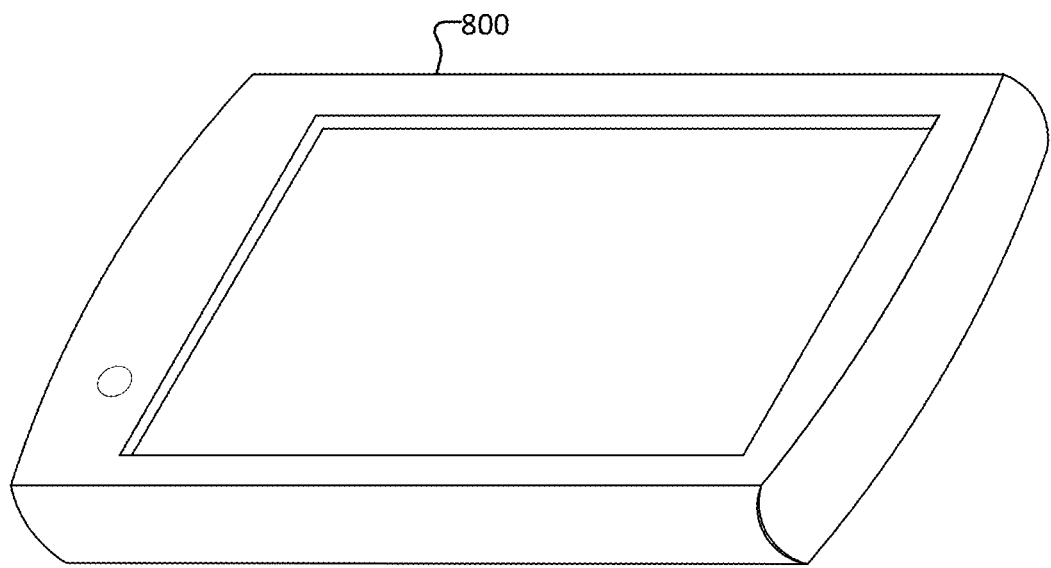

FIG. 8 illustrates a tablet computing device for executing one or more aspects of the present disclosure.

DETAILED DESCRIPTIONS

In the following detailed description, reference is made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

As detailed above, accessing multiple embedded web assets from a hosting application running on a rich client typically requires a user to repeatedly sign into these web assets—even where the embedded web assets are associated with the same user identity as the hosting application. In this case, the user may be forced to repeatedly input the same login credentials associated with the same user identity for each embedded web asset. Not only can repeatedly re-entering login credentials be frustrating to the user, resulting in a diminished user experience, such monotonous tasks may decrease productivity, increase Help Desk costs and calls, and increase the opportunities for security vulnerabilities.

Conversely, the system and methods disclosed herein enable single sign-on (SSO) mechanisms for rich hosting applications that include embedded web assets. For example, an identity cookie may be a packet of data captured by the browser upon authentication of the user identity used to access a web asset. An identity cookie may include information for validating user credentials and a reference to the user identity. When passed back to the browser at a later time, an identity cookie may serve to authenticate the user identity and allow subsequent access to the web asset. As may be appreciated, each identity cookie for the same user identity authenticating access to the same web asset provider may be substantially the same, whereas identity cookies for the same user identity authenticating access to different web asset providers may be substantially the same (or similar) or may be different. Such identity cookies may be received (or retrieved) by an identity provider and associated with the corresponding user identity.

In further aspects, at least one identity cookie for each user identity may be received (or retrieved) and stored by an identity management module provided on a rich client and/or within a rich hosting application. Thereafter, when web assets are launched within the rich hosting application under a particular user identity, the identity management module may pass an identity cookie associated with the particular user identity to the browser. In some aspects, multiple web assets launched within the rich hosting application under the same user identity may share the same identity cookie (e.g., web assets associated with the same web asset provider) or a similar identity cookie (e.g., web assets associated with different web asset providers). In either case, the identity management module may retrieve and store identity cookies for each user identity (and, if necessary, for multiple web asset providers) and a user may no longer need to repeatedly enter the same login credentials for each embedded web asset hosted under the same user identity.

For example, a user may be a substitute teacher and may have a different account (e.g., user identity) associated with each of the schools at which the user substitute teaches (e.g., a first account associated with alias walker@school1.eduorg and a second account associated with alias walker@school2.org). However, in this case the substitute teacher may not only be required to repeatedly enter user credentials for each web asset embedded within a first hosting document associated with the first account, but the burden may be compounded by the fact that the teacher is also required to repeatedly enter user credentials for each web asset embedded within a second hosting document associated with the second account. By using the systems and methods described herein, the teacher may no longer need to repeatedly enter login credentials for each web asset associated with each user identity. Rather, a single identity cookie may be shared across all browser instances of embedded web assets accessed via the same user identity for the same web asset provider from a rich client, thereby allowing a user to log into a rich hosting application once and thereafter access to any web asset embedded in any hosting document associated with the same user identity and the same web asset provider. Additionally, in cases where an embedded web asset within a rich hosting application is associated with a different web asset provider, the identity management module may store a similar identity cookie that represents authentication of the same user identity to the different web asset provider. In this case, while a single identity cookie may not be shared, the similar identity cookie may be passed to the browser when the user accesses this web asset within the rich hosting application, thereby also allowing the user to access this web asset without reentering user credentials. Productivity will increase, Help Desk costs will decrease, and account security will be strengthened.

Figure 1:
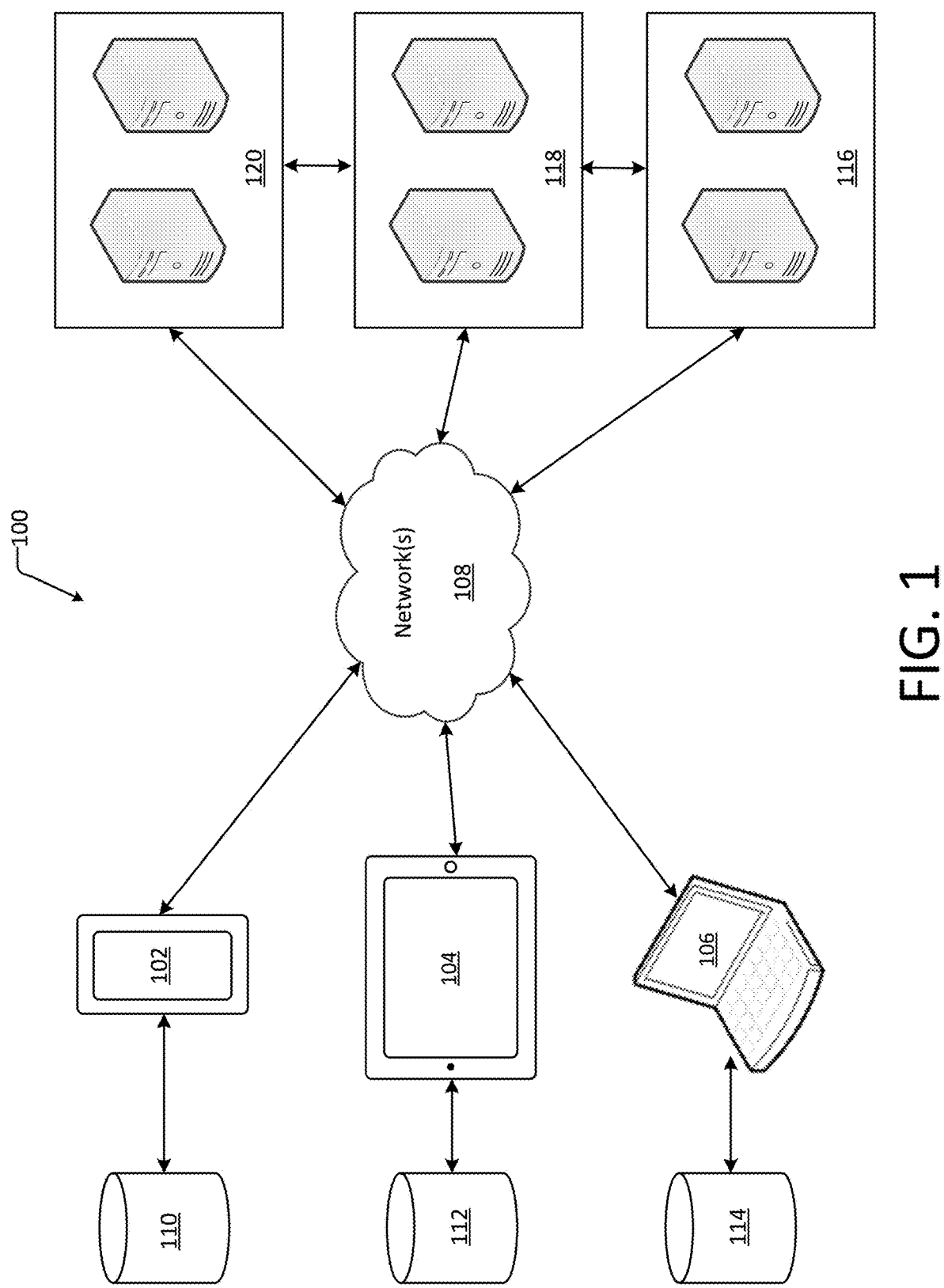
FIG. 1 illustrates an example of a distributed system for providing single sign-on (SSO) mechanisms on rich clients running applications that include embedded web assets.

FIG. 1 illustrates an example of a distributed system for providing single sign-on (SSO) mechanisms on rich clients running applications that include embedded web assets.

System 100 provides a single sign-on mechanism for a rich client hosting application (e.g., a note taking application, a word processing application, a presentation application, a messaging application, a spreadsheet application, etc.) that includes embedded web assets (e.g., resources provided by applications hosted by a website or web service and accessed via a browser) is provided. Such a system may be run on a rich client such as a computing device including, but not limited to, a mobile phone 102, a tablet 104, and a personal computer 106. The disclosed system may manage multiple user identities and allow a user to access multiple hosting applications that include embedded web assets under each user identity, without requiring the user to reenter login credentials for each of the hosting applications and embedded web assets associated with the same user identity. The disclosed system may use a single identity cookie that allows the user to access the various embedded web assets associated with the same user identity and the same web asset provider without having to input the same login credentials multiple times.

In an example aspect, a user may desire access to a specific embedded web asset within a rich hosting application. The user may access that rich hosting application via any rich client associated with the user, e.g., client devices 102, 104, 106, which may execute the single sign-on mechanism for accessing embedded web assets. In aspects, the rich hosting application may be accessed locally and an embedded web asset may be accessed remotely via a browser in communication with one or more servers (e.g., servers 116). The rich hosting application may store and provide at least one identity cookie for each user identity that allows access to the various embedded web assets without requiring the user to provide the same user credentials multiple times.

In further aspects, an identity provider may be associated with a first- or third-party web service executing on one or more other servers, e.g., servers 118. As described above, many applications rely on the same identity provider to store and verify user identities and corresponding user credentials. For instance, each user identity stored by the identity provider may be associated with corresponding user credentials (e.g., passwords, secret answers to questions, fingerprint scans, retinal scans, etc.). In response to a user logging into (e.g., inputting user credentials) an application under a particular user identity (e.g., user account), the identity provide may verify the user credentials corresponding to the user identity. Additionally, the identity provider may retrieve and store an identity cookie each time a user is authenticated to access a browser instance of a web application under various user accounts (e.g., user identities). That is, a user may access multiple web applications under a first user identity and may access the same or different web applications under a second user identity. The identity provider may store at least a first identity cookie upon authentication of the first user identity and at least a second identity cookie upon authentication of the second user identity. As may be appreciated, identity cookies captured for the same user identity for the same web asset provider may be substantially the same. Moreover, as identity cookies may in some cases age-out or expire, the identity provider may continuously or periodically replace a previous identity cookie associated with a user identity with a new identity cookie each time a user is authenticated to a web asset provider, after a period of time, or otherwise, to ensure that identity cookies are current and valid.

In still further aspects, at least one identity cookie for each user identity of a plurality of user identities may be managed by an identity management module provided on a rich client and/or within a rich hosting application. In aspects, an identity cookie for each of the plurality of user identities may be received (e.g., pushed) or retrieved (e.g., pulled) by the identity management module from the identity provider. The identity cookie may serve as a representation of authentication and may serve to authenticate the particular user account (e.g., to a web application). In some aspects, e.g., where the identity management module is provided on the rich client, the identity management module may manage multiple user identities associated with multiple identity providers. In this case, the identity management module may receive (or retrieve) at least one identity cookie representing authentication of each user identity associated with each of the multiple identity providers.

In aspects, a first identity cookie may be received in response to a request by the identity management module to authenticate a user for a first user identity; a second identity cookie may be received in response to a request by the identity management module to authenticate a user for a second user identity; etc. In aspects, once the first identity cookie and the second identity cookie are received based on a request for authentication, the first and second identity cookies are stored by the identity management module. However, in cases where an identity cookie has not been stored for a particular web asset provider, an identity cookie may be retrieved in real time (e.g., when needed such as in response to receiving user credentials for a corresponding user identity). For instance, the identity management module may store each identity cookie with a corresponding user identity (e.g., on storage 110, 112 and/or 114) for later retrieval. Storage 110, 112 and/or 114 may comprise one or more databases (e.g., relational databases or otherwise), indexes, graph data structures, etc., for storing identity cookies corresponding to a plurality of user identities.

In this way, when the user accesses a document provided by the rich hosting application using a particular user identity, one or more web assets embedded in the document may be accessed automatically using an identity cookie corresponding to the particular user identity. For example, when a user accesses a first hosting document provided by the rich hosting application using a first user identity, a web asset embedded in the first hosting document may be accessed automatically using a first identity cookie corresponding to the first user identity. That is, the identity management module may pass the first identity cookie to a browser for authenticating the first user identity and accessing the web asset (e.g., running on servers 116) via network(s) 108. Moreover, when a user accesses a second hosting document using a second user identity, the same or different web asset embedded in the second hosting document may be accessed automatically using a second identity cookie corresponding to the second user identity. In this case, the identity management module may pass the second identity cookie to a browser for authenticating the second user identity and accessing the same or different web asset (e.g., running on servers 116 or servers 120) via network(s) 108.

In aspects, the user identities, corresponding user credentials and corresponding identity cookies may be stored locally and/or remotely. For example, in aspects, an identity provider may store (e.g., on servers 118 and/or storage associated with servers 118) each user identity with corresponding user credentials and at least one corresponding identity cookie for a plurality of users. In aspect, the at least one identity cookie may be received (or retrieved) by the identity provider from at least one browser instance accessed under a corresponding user identity via network(s) 108. Additionally, an identity management module, e.g., provided by a rich client (e.g., a rich client device 102, 104 and/or 106) and/or by a hosting application running on a rich client, may store (e.g., on storage 110, 112 and/or 114) one or more user identities with corresponding user credentials and/or at least one corresponding identity cookie. In some cases, the at least one corresponding identity cookie for each of one or more user identities may be received (or retrieved) from the identity provider via network(s) 108.

As should be appreciated, the various methods, devices, components, etc., described with respect to FIG. 1 are not intended to limit systems 100 to being performed by the particular components described. Accordingly, additional topology configurations may be used to practice the methods and systems herein and/or components described may be excluded without departing from the methods and systems disclosed herein.

Figure 2:
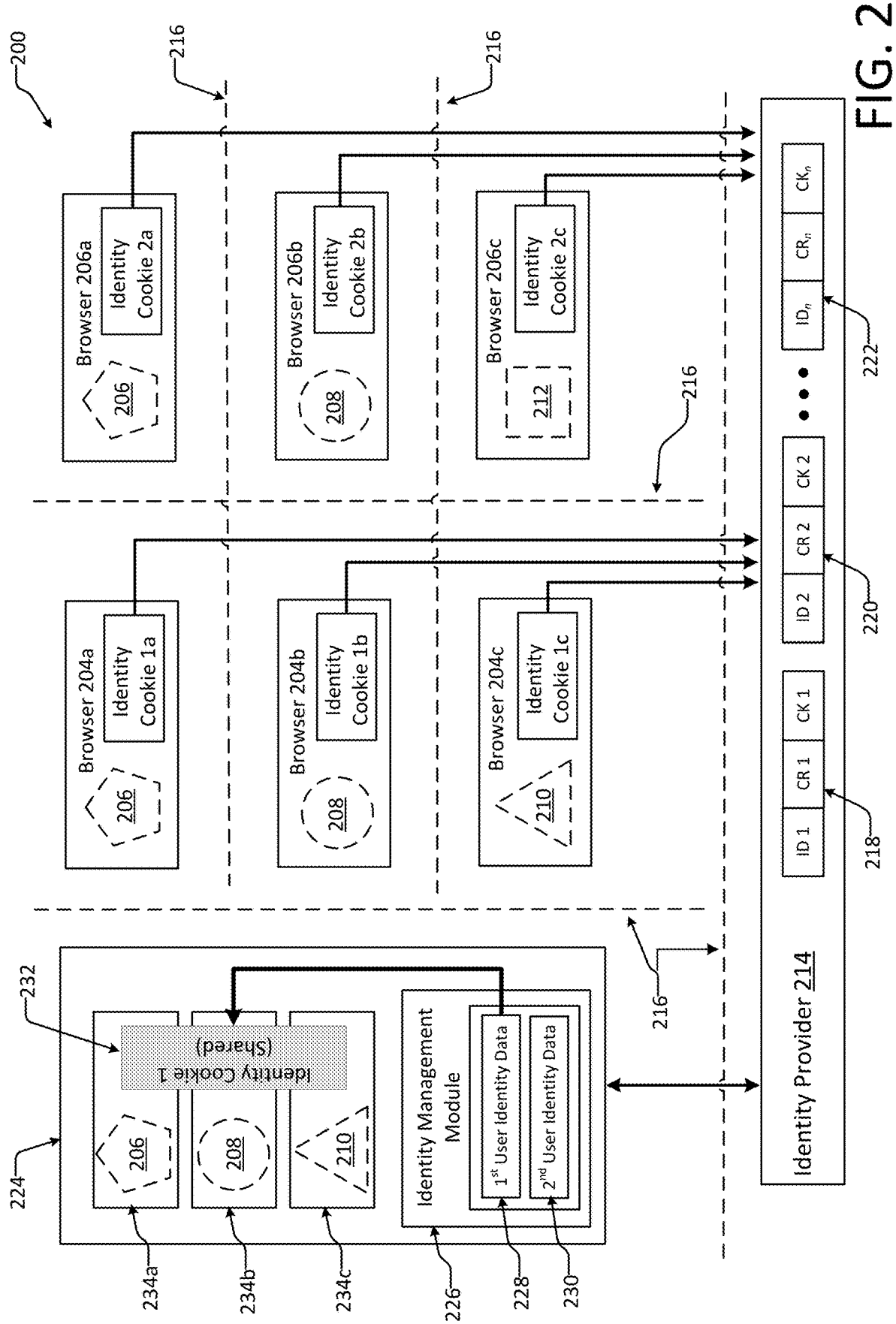
FIG. 2 is a block diagram illustrating a system for providing single sign-on (SSO) mechanisms on rich clients running applications that include embedded web assets.

FIG. 2 is a block diagram illustrating a system for providing single sign-on (SSO) mechanisms on rich clients running applications that include embedded web assets.

System 200 illustrates a first plurality of browser instances 204a, 204b and 204c. In aspects, each browser instance 204 may provide access to at least one web asset over a network. For instance, browser instance 204a may provide access to first web asset 206, browser instance 204b may provide access to second web asset 208, and browser instance 204c may provide access to third web asset 210. In one example aspect, web assets 206, 208 and 210 may be associated with the same asset provider. In such a scenario, the web assets 206, 208, and 210 may share the same identity cookie. In another example aspect, web assets 206, 208 and 210 may not be associated with the same asset provider, although the same user identity may be authenticated. In such a scenario, the identity cookies for different web asset providers authenticating the same user identity may be substantially the same but not identical (e.g., similar).

Additionally, in aspects, browser instances 204a, 204b, 204c may provide access to the web assets of a first web asset provider in response to receiving first user credentials corresponding to a first user identity (or a first user account). In this case, browser instance 204a accessed under the first user identity may capture a first identity cookie 1a (e.g., data packet) authenticating the first user identity for the first web asset provider. Similarly, browser instance 204b may capture a first identity cookie 1b (also authenticating the first user identity) and browser instance 204c may capture a first identity cookie 1c (also authenticating the first user identity). As may be appreciated, first identity cookies 1a, 1b, 1c may be substantially the same in that each of the first identity cookies 1a, 1b, 1c authenticates the first user identity to the first web asset provider. Alternatively, if browser instances 204a, 204b, 204c provide access to web assets associated with different web asset providers, first identity cookies 1a, 1b, and 1c may be different. For example, the first user credentials may be used to access a web asset hosted by the different web asset provider but the information for validating user credentials provided in the first identity cookies 1a, 1b and 1c may be different. That is, where the web asset provider is not the same, that browser instance may capture a slightly different identity cookie upon authentication than the other browser instances.

System 200 also illustrates a second plurality of browser instances 206a, 206b and 206c. In aspects, each browser instance 206 may provide access to the same or different web assets as browser instances 204 over a network. For instance, browser instance 206a may provide access to first web asset 206 (e.g., associated with the first web asset provider), browser instance 206b may provide access to second web asset 208 (e.g., associated with the first asset provider), and browser instance 206c may provide access to fourth web asset 212 (e.g., associated with the first web asset provider or a second web asset provider).

Additionally, in aspects, browser instances 206a, 206b, 206c may provide access to the web assets in response to receiving second user credentials corresponding to a second user identity (or a second user account). In this case, browser instance 206a accessed under the second user identity may capture a second identity cookie 2a (e.g., data packet) authenticating the second user identity to the first web asset provider. Similarly, browser instance 206b may capture a second identity cookie 2b (e.g., authenticating the second user identity to the first web asset provider) and browser instance 206c may capture a second identity cookie 2c (e.g., authenticating the second user identity to the first web asset provider or a second web asset provider). As may be appreciated, second identity cookies 2a, 2b, 2c may be substantially the same if each of the second identity cookies 2a, 2b, 2c authenticate the second user identity to the same web asset provider (e.g., the first web asset provider).

Additionally, as may be appreciated, second identity cookies 2a, 2b, and 2c may be different where the second identity cookies authenticate the second user identity to different web asset providers (e.g., first and second web asset providers). For example, although the same second user credentials may be used to access web assets hosted by different web asset providers, the information for validating user credentials provided in the second identity cookies 2a, 2b and 2c may be different. That is, where the web asset provider is different, a browser instance may capture a slightly different identity cookie upon authentication for the different web asset provider.

System 200 also illustrates identity provider 214, which may receive (e.g., pushed) and/or retrieve (e.g., pull) first identity cookies 1a, 1b, 1c from browser instances 204a, 204b, 204c and second identity cookies 2a, 2b, 2c from browser instances 206a, 206b, 206c across system boundary 216 (e.g., over a network). Retrieval of the identity cookies from the browser may involve identifying a location (e.g., a particular folder, index, field, object, graph, etc.) in which the browser stores identity cookies. Such location may vary from browser to browser. In aspects, identity provider 214 may manage user identities and corresponding user credentials for a plurality of users. That is, each user identity may be associated with corresponding user credentials. Additionally, each user identity may be associated with at least one identity cookie retrieved from a browser instance. In some cases, a previous identity cookie may be replaced by a newly received identity cookie such that identity cookies associated with user identities may not age-out or expire. Information associated with a user identity may be stored in a relational database, index, graph database, etc., associated with identity provider 214.

As illustrated, a first data structure 218 (e.g., stored in a relational database, index, graph database, etc.) may include a first user identity (e.g., ID1), first user credentials (e.g., CR1) and at least one first identity cookie (e.g., CK1). In aspects, the same first identity cookie (CK1) may be captured by any browser instance accessed via the first user identity for the same web asset provider (e.g., first identity cookie 1a, 1b, 1c . . . 1n) and may be continuously or periodically replaced with more recent first identity cookies. Alternatively, different first identity cookies (CK1') may be captured by any browser instance accessed via the first user identity for a different web asset provider and may be continuously or periodically replaced with more recent identity cookies. As further illustrated, a second data structure 220 (e.g., stored in a relational database, index, graph database, etc.) may include a second user identity (e.g., ID2), second user credentials (e.g., CR2) and at least one second identity cookie (e.g., CK2). In aspects, the same second identity cookie (CK2) may be captured by any browser instance accessed via the second user identity for the same web asset provider (e.g., second identity cookie 2a, 2b, 2c . . . 2n) and may be continuously or periodically replaced with more recent second identity cookies. Alternatively, different second identity cookies (CK2') may be captured by any browser instance accessed via the second user identity for a different web asset provider and may be continuously or periodically replaced with more recent identity cookies. Additionally, the identity provider 214 may store additional data structures associated with a plurality of additional user identities (e.g., additional data structure 222).

As further illustrated, system 200 includes a hosting application 224 running on a rich client (e.g., rich client device 102, 104 or 106 of FIG. 1). The hosting application 224 may include an identity management module 226 that may manage multiple user identities for a user. For example, the identity management module 226 may store first user identity data 228 and second user identity data 230. In aspects, first user identity data 228 may include at least a first identity cookie for authenticating the first user identity, and the second user identity data 230 may include at least a second identity cookie for authenticating the second user identity. The identity management module 224 may receive identity cookies from the identity provider 214 in response to a request to authenticate the user for a particular user identity. For example, a first identity cookie may be received from identity provider 214 in response to a request to authenticate a user for a first user identity; the second identity cookie may be received from identity provider 214 in response to a request to authenticate a user for a second user identity; etc.

In a first example, a user may log into a rich hosting application, such as OneNote®, PowerPoint®, Microsoft® Word, etc., under a first user identity and may open a first hosting document including one or more embedded web assets. The rich hosting application 224 may access identity management module 226 to determine if a first identity cookie associated with the first user identity is stored in first user identity data 228. If the first identity cookie is stored in the first user identity data 228, the identity management module may provide the first identity cookie to one or more browser instances 234. In further aspects, the first identity cookie (e.g., first identity cookie 232) may be shared by each of the browser instances 234 for the same web asset provider. That is, for the same web asset provider, browser instance 234a may provide access to first web asset 206 based on first identity cookie 232, browser instance 234b may provide access to second web asset 208 based on first identity cookie 232, and browser instance 234c may provide access to third web asset 208 based on first identity cookie 332. In each case, the user may not be required to enter first user credentials corresponding to the first user identity in order to access first web asset 206, second web asset 208 and/or third web asset 210 embedded in the first hosting document. In other example aspects, web assets 206, 208, and/or 210 may not share the same web asset provider but still share the same user identity for the same identity provider. In such an example aspect, the identity cookies captured by the browser for each of the web assets may be slightly different. As a result, the first identity cookie 232 may be shared for one or more of the web assets 206, 208, and/or 210. For example, the first identity cookie 232 may be shared for web assets 208 and 210 where they share the same web asset provider, but a different identity cookie may be provided for accessing web asset 206 where it is hosted by a different web asset provider.

Alternatively, if the first identity cookie is not stored, then the identity management module 226 may retrieve the first identity cookie from the identity provider 214 (e.g., stored in data structure 218 for the first user identity). The identity management module 226 may then store the first identity cookie with first user identity data 228 and may provide the first identity cookie 232 to one or more browser instances 234 for access to first web asset 206, second web asset 208 and/or third web asset 210 embedded within rich hosting application. If the first identity cookie is not stored by either identity management module 226 or identity provider 214, the rich hosting application 224 may redirect the user to a browser for the input of the first user credentials corresponding to the first user identity in order to access the one or more embedded web assets.

In a second example, a user may log into a rich hosting application, such as OneNote®, PowerPoint®, Microsoft® Word, etc., under a second user identity and may open a second hosting document including one or more embedded web assets for the same web asset provider. The rich hosting application 224 may access identity management module 226 to determine if a second identity cookie associated with the second user identity is stored in second user identity data 230. If the second identity cookie is stored in the second user identity data 230, the identity management module may provide the second identity cookie to one or more browser instances for accessing the embedded web assets (not shown). In further aspects, the second identity cookie may be shared over a plurality of browser instances for accessing embedded web assets associated with the same web asset provider (not shown). That is, a first browser instance may provide access to first web asset 206 based on the second identity cookie, a second browser instance may provide access to second web asset 208 based on the second identity cookie (or a similar second identity cookie), and a third browser instance may provide access to fourth web asset 210 based on the second identity cookie (or a similar second identity cookie). In each case, the user may not be required to enter second user credentials corresponding to the second user identity in order to access first web asset 206, second web asset 208 and/or fourth web asset 212 embedded in the second hosting document (not shown).

In a third example, a user may log into a rich hosting application, such as OneNote®, PowerPoint®, Microsoft® Word, etc., under a second user identity and may open a second hosting document including one or more embedded web assets. In this example, the web assets 206, 208, and 212 may be different forms associated with web asset provider Microsoft® Forms or different documents or videos associated with web asset provider GeoGebra®. More specifically, the web assets 206, 208, and 212 may be different web asset that share the same asset provider (e.g., Microsoft® Forms or GeoGebra®). In other instances, one of the web assets 206, 208, and/or 212 may be authenticated using the same user identity (e.g., associated with the same identity provider), but the web asset may be hosted by a different web asset provider (e.g., GeoGebra®). In such an instance, the identity cookie captured by the browser instance upon authentication to the different web asset provider may be slightly different than an identity cookie captured by a browser instance(s) upon authentication to the same web asset provider.

As should be appreciated, the various methods, devices, components, etc., described with respect to FIG. 2 are not intended to limit systems 200 to being performed by the particular components described. Accordingly, additional topology configurations may be used to practice the methods and systems herein and/or components described may be excluded without departing from the methods and systems disclosed herein.

Figure 3:
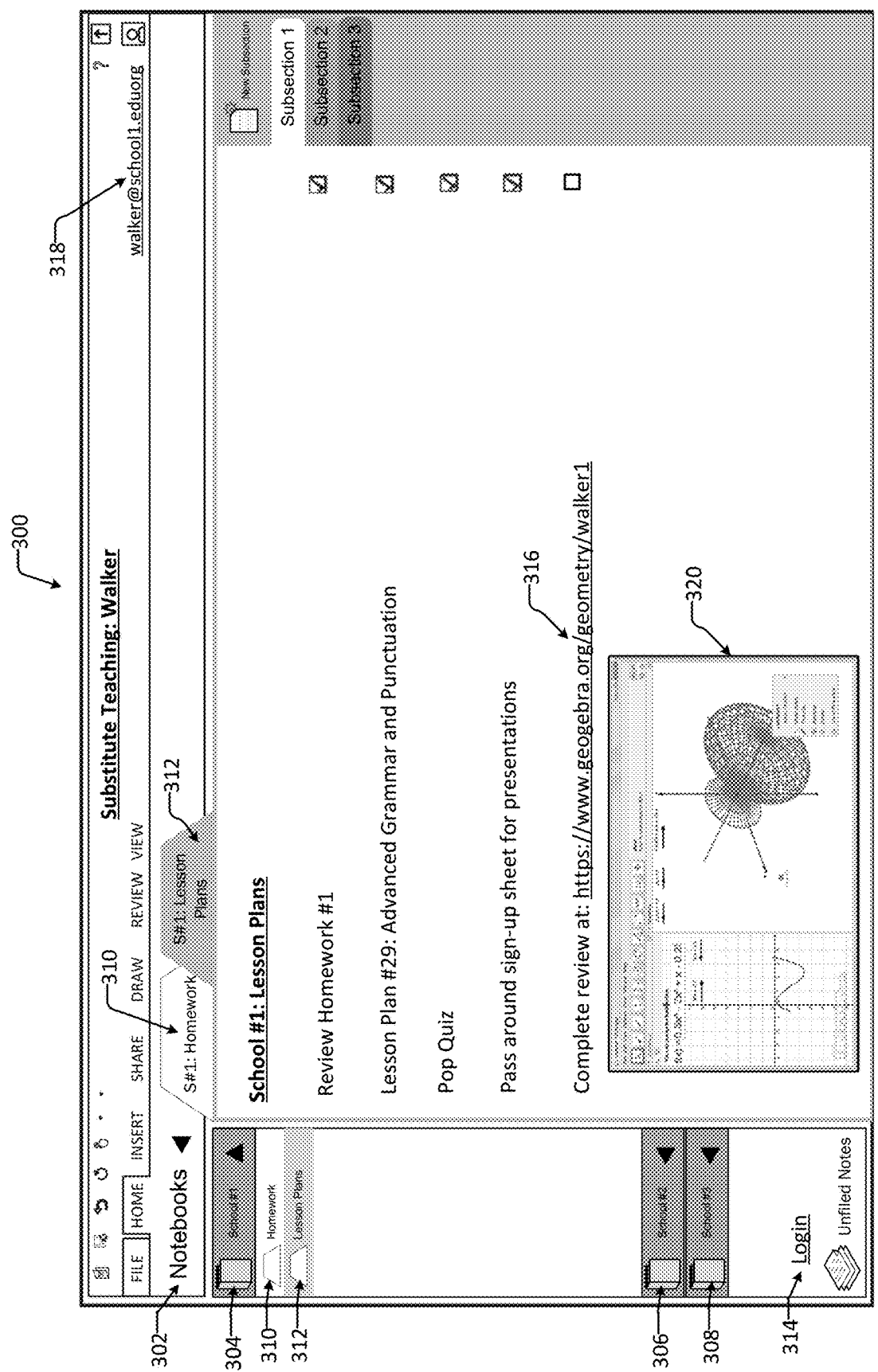
FIG. 3 illustrates an example interface of a rich hosting application utilizing a single sign-on mechanism to access embedded web assets.

FIG. 3 illustrates an example interface of a rich hosting application utilizing a single sign-on mechanism to access embedded web assets.

Example interface 300 is provided for a rich hosting notebook application 302, such as OneNote®, running on a rich client. As illustrated, a user may be serving as a substitute teacher for multiple schools. The various schools might assign the user different user accounts (or user identities). In order to effectively and efficiently manage these different user accounts and associated applications including embedded web assets, it would be advantageous to leverage the SSO mechanism disclosed herein. For example, a user may be able to access a first notebook 304 associated with a first user account 318 (e.g., walker@school1.eduorg) for School #1. To access first notebook 304, the user may login by accessing user login control 314 and entering first user credentials (e.g., a password associated with first user account 318). Additionally, first notebook 304 includes note pages such as homework 310 and lesson plans 312, such note pages may each include one or more web assets (e.g., links to resources provided by applications hosted by a website or web service and accessed via a browser). For instance, link 316 is a URL for embedded web asset 320, which is a geometry review associated with the substitute teacher's first user account 318 provided in a browser window within lesson plans 312. In some cases, link 316 may not be displayed at all and/or may not be explicitly displayed by may be a hyperlink associated with descriptive text (e.g., "Geometry Review"). Furthermore, embedded web asset 320, which is associated with the embedded browser window, may be accessed directly from within the rich hosting application (e.g., without following link 316). In some instances, a user may be prompted to first click the link 316, which may then launch the embedded browser window to allow access to the embedded web asset 320 within the rich hosting application.

Access to the embedded web asset 320 would ordinarily require the substitute teacher to enter first user credentials for the first user account 318. However, according to aspects disclosed herein, the substitute teacher may access embedded web asset 320 from within lesson plans 312 of rich hosting notebook application 302 without entering the first user credentials. That is, the rich hosting notebook application 302 may store a first identity cookie corresponding to the first user account 318 and, when the substitute teacher is accessing the first notebook 304, the first identity cookie may be provided to a web browser to automatically access the embedded web asset 320. Additionally, the substitute teacher may access any other embedded web asset provided by the same web asset provider from within the first notebook 304 based on the first identity cookie (or based on a similar first identity cookie for a different web asset provider). Moreover, as web assets for the same web asset provider are added to existing or new note pages of the first notebook 304, each of these new web assets may also be accessed via the first identity cookie (or based on a similar first identity cookie for a different web asset provider). In this way, the substitute teacher may access multiple embedded web assets within the first notebook 304 via the first identity cookie (or a similar first identity cookie) without reentering first user credentials.

In further aspects, the rich hosting notebook application 302 may provide a second notebook 306 associated with a second user account (e.g., walker@school2.eduorg) for School #2. To access second notebook 306, the user may login by accessing user login control 314 and entering second user credentials (e.g., a password associated with the second user account). In this case, the rich hosting notebook application 302 may store a second identity cookie corresponding to the second user account. When the substitute teacher is accessing the second notebook 306, the second identity cookie may be provided to a web browser to automatically access any embedded web asset from within the second notebook 306. Moreover, as web assets are added to existing or new note pages of the second notebook 306, each of these new web assets may also be accessed via the second identity cookie. In this way, the substitute teacher may access multiple embedded web assets within the second notebook 306 via the second identity cookie without reentering second user credentials.

In still further aspects, the rich hosting notebook application 302 may provide a third notebook 308 associated with a third user account (e.g., walker@school3.eduorg) for School #3. To access third notebook 308, the user may login by accessing user login control 314 and entering third user credentials (e.g., a password associated with the third user account). In this case, the rich hosting notebook application 302 may store a third identity cookie corresponding to the third user account. When the substitute teacher is accessing the third notebook 308, the third identity cookie may be provided to a web browser to automatically access any embedded web asset associated with the same identity provider from within the third notebook 308 (or based on a similar third identity cookie for web assets associated with different web asset providers). Moreover, as web assets for the same identity provider are added to existing or new note pages of the third notebook 308, each of these new web assets may also be accessed via the third identity cookie (or based on a similar third identity cookie for web assets associated with different web asset providers). In this way, the substitute teacher may access multiple embedded web assets within the third notebook 308 via the third identity cookie (or a similar third identity cookie) without reentering third user credentials.

In some example aspects, the first identity cookie, second identity cookie and/or the third identity cookie may be associated with an expiration period. After such a period, a user may be required to reenter user credentials associated with each of the three user accounts. Alternatively, when the first identity cookie, second identity cookie and/or the third identity cookie expire, the rich hosting notebook application 302 (e.g., via an identity management module) may retrieve one or more current first, second and/or third identity cookies from an identity provider. However, in other scenarios, the identity cookies may not expire, allowing a user to continuously and seamlessly access multiple embedded web assets associated with multiple user accounts without having to repeatedly reenter user credentials for each of the user accounts.

As should be appreciated, the various methods, devices, components, etc., described with respect to FIG. 3 are not intended to limit systems 300 to being performed by the particular components described. Accordingly, additional topology configurations may be used to practice the methods and systems herein and/or components described may be excluded without departing from the methods and systems disclosed herein.

FIGS. 4A and 4B provide a flowchart illustrating a method for providing single sign-on (SSO) mechanisms on rich clients running applications that include embedded web assets.

The method 400 begins with receive operation 402. At receive operation 402, a first identity cookie associated with a first user identity may be received by a rich client device and/or a rich hosting application running on a rich client device. A hosting application may refer to any application that may host (or include) other embedded applications (e.g., embedded web assets). Examples of hosting applications include any productivity application, such as notebook applications, word-processing applications, presentation applications, spreadsheet applications, and the like. The first identity cookie may be a packet of data captured by a browser when a user associated with the first user identity (or first user account) utilizes the browser to access a web asset associated with a particular web asset provider. The first identity cookie may represent an authentication of the first user identity. When passed back to the browser at a later time, the first identity cookie may serve to authenticate the first user identity and allow subsequent access to the web asset for the particular web asset provider. In aspects, the first identity cookie may be received (or retrieved) from a browser. Retrieval of identity cookies from the browser may involve identifying a location (e.g., a particular folder, index, field, object, graph, etc.) in which the browser stores identity cookies. Such location may vary from browser to browser. In other aspects, the first identity cookie may be received (or retrieved) from an identity provider.

At receive operation 404, similar to receive operation 402, a second identity cookie associated with a second user identity may be received by a rich client device and/or a rich hosting application running on a rich client device. The second identity cookie may be a packet of data captured by a browser when a user associated with the second user identity (or second user account) utilizes the browser to access a web asset associated with a particular web asset provider. In aspects, the same user may be associated with the first user identity and the second user identity. The second identity cookie may represent authentication of the second user identity. When passed back to the browser at a later time, the second identity cookie may serve to authenticate the second user identity and allow subsequent access to the web asset for the particular web asset provider. As with the first identity cookie, the second identity cookie may be received (or retrieved) from a browser. Alternatively, the second identity cookie may be received (or retrieved) from an identity provider.

At store operation 406, the first identity cookie and the second identity cookie may be stored by the rich client device and/or the rich hosting application running on the rich client device. For example, an identity management module may store the first identity cookie and the second identity cookie. In aspects, the first identity cookie may be stored with other first user identity data, such as first user credentials, additional first identity cookies (e.g., associated with different web asset providers); and the second identity cookie may be stored with other second user identity data, such as second user credentials, additional second identity cookies (e.g., associated with different web asset providers); etc. The first user identity data and the second identity data may be stored by the identity management module in a relational database, index, graph database, or other data structure. Further, the first user identity data and the second identity data may be stored locally and/or remotely to the rich client device.

At operation 408, first user credentials may be received by the rich hosting application. The first user credentials may be received as direct input from the user (e.g., password via a physical or virtual keyboard), from a credentialing device (e.g., fingerprint scanner, optical scanner, keycard reader, etc.), from the rich client operating system (e.g., based on an initial login to the system), or otherwise.

At authenticate operation 410, the received first user credentials may be verified or authenticated for the first user identity. That is, the received first user credentials may be compared with stored first user credentials for the first user identity. In one aspect, the stored first user credentials may be included in first user identity data associated with an identity management module. In this case, the identity management module may authenticate the first user identity by comparing the received first user credentials to the stored first user credentials. Alternatively, the stored first user credentials may be stored and managed by an identity provider. In this case, the identity provider may authenticate the first user identity by comparing the received first user credentials to the stored first user credentials. Upon authenticating the first user identity, the identity provider may notify the identity management module that the first user identity has been authenticated.

At provide operation 412, access to the rich hosting application may be provided. That is, in response to authenticating the received first user credentials, the user may gain access to the rich hosting application under the first user identity (or the first user account). In this way, the user may access any hosting documents created under the first user identity by the rich hosting application. For example, the user may access one or more notebooks including one or more note pages (or tabs) that were created under the first user identity.

At receive indication operation 414, an indication may be received to access a first web asset embedded in a first hosting document (e.g., first notebook) created under the first user identity. For example, a note page of the first notebook may include the first embedded web asset. That is, the note page may include an activator such as a link, window, control, icon, etc., for launching or providing the first web asset from within the note page. An indication to access the first embedded web asset may be received by clicking, hovering over, touching, swiping, etc., the activator associated with the first embedded web asset. In aspects, authentication of the first user identity is required to access the first embedded web asset.

At provide operation 416, the first identity cookie may be provided (or passed) to a browser. In aspects, and identity management module (e.g., within the rich hosting application) may pass the first identity cookie to the browser.

At enable operation 418, access to the first embedded web asset may automatically be enabled under the first user identity without requiring the user to reenter first user credentials. That is, in response to receiving the first identity cookie, the first user identity may be authenticated to the web asset provider hosting the first web asset and the user may access the first web asset.

At operation 420, second user credentials may be received by the same rich hosting application (e.g., first rich hosting application) or a different rich hosting application (e.g., a second rich hosting application). The second user credentials may be received as direct input from the user (e.g., password via a physical or virtual keyboard), from a credentialing device (e.g., fingerprint scanner, optical scanner, keycard reader, etc.), from the rich client operating system (e.g., based on an initial login to the system), or otherwise.

At authenticate operation 422, the received second user credentials may be verified or authenticated for a second user identity. That is, the received second user credentials may be compared with stored second user credentials for the second user identity. In one aspect, the stored second user credentials may be included in second user identity data associated with an identity management module. In this case, the identity management module may authenticate the second user identity by comparing the received second user credentials to the stored second user credentials. Alternatively, the stored second user credentials may be stored and managed by an identity provider. In this case, the identity provider may authenticate the second user identity by comparing the received second user credentials to the stored second user credentials. Upon authenticating the second user identity, the identity provider may notify the identity management module that the second user identity has been authenticated.

At provide operation 424, access to the first rich hosting application (or a second rich hosting application) may be provided. That is, in response to authenticating the received second user credentials, the user may gain access to the first or second rich hosting application under the second user identity (or the second user account). In this way, the user may access any hosting documents created under the second user identity by the first or second rich hosting applications. For example, the user may access one or more notebooks including one or more note pages (or tabs) that were created under the second user identity (by either the first or second rich hosting application).

At receive indication operation 426, an indication may be received to access a second web asset embedded in a second hosting document (e.g., second notebook) created under the second user identity. For example, a note page of the second notebook may include the second embedded web asset. In aspects, the second web asset and the first web asset may be of the same asset type (e.g., a document, image, form, etc.) but may be different web assets (e.g., a first document created under the first user identity vs. a second document created under the second user identity). That is, the note page may include an activator such as a link, window, control, icon, etc., for launching or providing the second web asset from within the note page. An indication to access the second embedded web asset may be received by clicking, hovering over, touching, swiping, etc., the activator associated with the embedded web asset. In aspects, authentication of the second user identity is required to access the embedded web asset.

At provide operation 428, the second identity cookie may be provided (or passed) to a browser. In aspects, the identity management module (e.g., within the rich hosting application) may pass the second identity cookie to the browser.

At enable operation 430, access to the second embedded web asset may automatically be enabled under the second user identity without requiring the user to reenter second user credentials. That is, in response to receiving the second identity cookie, the second user identity may be authenticated to the web asset provider hosting the second web asset and the user may access the second web asset.

As should be appreciated, operations 402-430 of method 400 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, as described herein.

FIG. 5 is a block diagram illustrating example physical components (e.g., hardware) of a computing device 500 with which aspects of the disclosure may be practiced. The computing device components described below may have computer-executable instructions for implementing an identity manager module 520 on a computing device (e.g., server computing device and/or client computing device). The computer-executable instructions for an identity manager module 520 can be executed to implement the methods disclosed herein, including a method of providing a single sign-on mechanism for a rich client hosting embedded web assets, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running an identity manager module 520, and, in particular, an identity cookie manager 511, a rich client manager 513, a browser communication manager 515, and/or UX Component 517.

The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., identity manager module 520) may perform processes including, but not limited to, the aspects, as described herein. Other program modules that may be used in accordance with aspects of the present disclosure, and in particular for providing a single sign-on mechanism for a rich client hosting embedded web assets, may include identity cookie manager 511, rich client manager 513, browser communication manager 515, and/or UX Component 517, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include tangible storage media such as RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such tangible computer storage media may be part of the computing device 500. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, wearable computer (such as a smart watch or head-mounted display for virtual reality applications), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as email or other messages used by an email application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the instructions for providing a single sign-on mechanism for a rich client running applications hosting embedded web assets, (e.g., identity cookie manager 511, rich client manager 513, browser communication manager 515, and/or UX Component 517, etc.).

The system 602 has a power supply 670, which may be implemented as one or more batteries. The power supply 670 may further include an external power source, such as an AC adapter or a powered docking cradle that supplements or recharges the batteries. The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via an audio transducer 625 (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of peripheral device 630 (e.g., on-board camera) to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

As should be appreciated, FIGS. 6A and 6B are described for purposes of illustrating the present methods and systems and are not intended to limit the disclosure to a particular sequence of steps or a particular combination of hardware or software components.

FIG. 7 illustrates one aspect of the architecture of a system for processing data received at a computing system from a remote source, such as a general computing device 704 (e.g., personal computer), tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking service 730. The identity manager module 721 may be employed by a client that communicates with server device 702, and the identity provider 720 may be employed by server device 702. The server device 702 may provide data to and from a client computing device such as a general computing device 704, a tablet computing device 706 and/or a mobile computing device 708 (e.g., a smart phone) through a network 715. By way of example, the computer system described above with respect to FIGS. 1-7 may be embodied in a general computing device 704 (e.g., personal computer), a tablet computing device 706 and/or a mobile computing device 708 (e.g., a smart phone). Any of these embodiments of the computing devices may obtain content from the store 716, in addition to receiving graphical data useable to either be pre-processed at a graphic-originating system or post-processed at a receiving computing system.

As should be appreciated, FIG. 7 is described for purposes of illustrating the present methods and systems and is not intended to limit the disclosure to a particular sequence of steps or a particular combination of hardware or software components.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 8 is described for purposes of illustrating the present methods and systems and is not intended to limit the disclosure to a particular sequence of steps or a particular combination of hardware or software components.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A processor-implemented method of providing a single sign-on mechanism for embedded web assets, comprising:
   receiving, by a hosting application, a first identity cookie associated with a first user identity and a second identity cookie associated with a second user identity, wherein the hosting application hosts one or more hosting documents on a client device;
   receiving first user credentials for accessing the hosting application, wherein the first user credentials are associated with the first user identity, and wherein the hosting application comprises a first-party web application;
   storing the first identity cookie authenticated by the first user credentials at the client device;
   receiving a first indication to access a first web asset embedded in a first hosting document of the one or more hosting documents, wherein the first embedded web asset is a resource accessed via a browser launched from within the first hosting document, and wherein the first embedded web asset is hosted by a third-party web application, the third-party web application executing on the client device;
   based at least in part on the first identity cookie, automatically enabling access to the first embedded web asset without requiring re-entry of the first user credentials;
   receiving second user credentials for accessing the hosting application, wherein the second user credentials are associated with the second user identity;
   storing the second identity cookie authenticated by the second user credentials at the client device;
   receiving a second indication to access a second web asset embedded in a second hosting document of the one or more hosting documents; and
   based at least in part on the second identity cookie, automatically enabling access to the second embedded web asset without requiring re-entry of the second user credentials.

2. The processor-implemented method of claim 1, wherein the hosting application is one of a notebook application, a word-processing application, a spreadsheet application, and a presentation application.

3. The processor-implemented method of claim 2, wherein the first hosting document is a first notebook and wherein the second hosting document is a second notebook.

4. The processor-implemented method of claim 1, wherein access to the first embedded web asset is based at least in part on authenticating the first user identity, and wherein access to the second embedded web asset is based at least in part on authenticating the second user identity.

5. The processor-implemented method of claim 4, wherein the first identity cookie authenticates the first user identity, and wherein the second identity cookie authenticates the second user identity.

6. The processor-implemented method of claim 4, wherein access to the first embedded web asset is automatically enabled based on a third identity cookie that includes at least one entry value in common with the first identity cookie without providing first user credentials, and wherein access to the second embedded web asset is automatically enabled based on a fourth identity cookie that includes at least one entry value in common with entry values in the second identity cookie without providing second user credentials.

7. The processor-implemented method of claim 1, wherein the first identity cookie comprises a first data packet captured by the browser in response to authenticating the first user identity, and wherein the second identity cookie comprises a second data packet captured by the browser in response to authenticating the second user identity.

8. The processor-implemented method of claim 7, wherein the first identity cookie and the second identity cookie are stored by an identity provider.

9. The processor-implemented method of claim 7, wherein the first identity cookie and the second identity cookie are stored by the hosting application.

10. The processor-implemented method of claim 1, wherein a user associated with the first user identity is the same user associated with the second user identity.

11. A system for providing a single sign-on mechanism for embedded web assets, comprising:
    at least one processing unit; and
    at least one memory storing computer-executable instructions that when executed by the at least one processing unit cause the system to:
      receive, by a hosting application, a first identity cookie associated with a first user identity and a second identity cookie associated with a second user identity, wherein the hosting application hosts one or more hosting documents on a client device;
      receive first user credentials for accessing the hosting application, wherein the first user credentials are associated with the first user identity, and wherein the hosting application comprises a first-party web application;
      receive a first indication to access a first web asset embedded in a first hosting document of the one or more hosting documents on the client device, wherein the first embedded web asset is a resource accessed via a browser launched from within the first hosting document, and wherein the first embedded web asset is hosted by a third-party web application, the third-party web application executing on the client device;
      based at least in part on the first identity cookie, automatically enable access to the first embedded web asset without requiring re-entry of the first user credentials;
      receive second user credentials for accessing the hosting application, wherein the second user credentials are associated with the second user identity;
      receive a second indication to access a second web asset embedded in a second hosting document of the one or more hosting documents; and
      based at least in part on the second identity cookie, automatically enable access to the second embedded web asset without requiring re-entry of the second user credentials.

12. The system of claim 11, wherein access to the first embedded web asset is based at least in part on authenticating the first user identity, and wherein access to the second embedded web asset is based at least in part on authenticating the second user identity.

13. The system of claim 12, wherein the first identity cookie authenticates the first user identity, and wherein the second identity cookie authenticates the second user identity.

14. The system of claim 11, wherein the first identity cookie comprises a first data packet captured by the browser in response to authenticating the first user identity, and wherein the second identity cookie comprises a second data packet captured by the browser in response to authenticating the second user identity.

15. The system of claim 11, wherein the hosting application is one of a notebook application, a word-processing application, a spreadsheet application, and a presentation application.

16. The system of claim 11, wherein a user associated with the first user identity is the same user associated with the second user identity.

17. A computer storage device comprising computer-executable instructions that when executed by a processing unit cause the processing unit to:
 receive, by a hosting application, a first identity cookie associated with a first user identity and a second identity cookie associated with a second user identity, wherein the hosting application hosts one or more hosting documents on a client device;
 receive first user credentials for accessing the hosting application, wherein the first user credentials are associated with the first user identity, and wherein the hosting application comprises by a first-party web application;
 receive a first indication to access a first web asset embedded in a first hosting document of the one or more hosting documents on the client device, wherein access to the first embedded web asset is based at least in part on authenticating the first user identity, wherein the first embedded web asset is a resource accessed via a browser launched from within the first hosting document, and wherein the first embedded web asset is hosted by a third-party web application, the third-party web application executing on the client device;
 based at least in part on the first identity cookie, automatically enable access to the first embedded web asset without requiring re-entry of the first user credentials;
 receive second user credentials for accessing the hosting application, wherein the second user credentials are associated with the second user identity;
 receive a second indication to access a second web asset embedded in a second hosting document of the one or more hosting documents, wherein access to the second embedded web asset is based at least in part on authenticating the second user identity; and
 based at least in part on the second identity cookie, automatically enable access to the second embedded web asset without requiring re-entry of the second user credentials.

18. The computer storage device of claim 17, wherein the first identity cookie authenticates the first user identity, and wherein the second identity cookie authenticates the second user identity.

19. The computer storage device of claim 17, wherein the first identity cookie comprises a first data packet captured by the browser in response to authenticating the first user identity, and wherein the second identity cookie comprises a second data packet captured by the browser in response to authenticating the second user identity.

20. The computer storage device of claim 17, wherein a user associated with the first user identity is the same user associated with the second user identity.

* * * * *